(12) United States Patent
Bonvin

(10) Patent No.: US 9,391,544 B2
(45) Date of Patent: Jul. 12, 2016

(54) ASYMMETRICAL DRIVER

(75) Inventor: Frederic Bonvin, Longmont, CO (US)

(73) Assignee: STMicroelectronics, Inc., Coppell, TX (US)

( * ) Notice: Subject to any disclaimer, the term of this patent is extended or adjusted under 35 U.S.C. 154(b) by 1156 days.

(21) Appl. No.: 12/620,929

(22) Filed: Nov. 18, 2009

(65) Prior Publication Data

US 2010/0123419 A1     May 20, 2010

Related U.S. Application Data

(60) Provisional application No. 61/115,870, filed on Nov. 18, 2008.

(51) Int. Cl.

| | |
|---|---|
| *H02P 6/14* | (2006.01) |
| *H02P 3/14* | (2006.01) |
| *H02P 3/22* | (2006.01) |
| *H02M 7/5388* | (2007.01) |
| *H02P 6/08* | (2016.01) |
| *H02P 7/29* | (2006.01) |
| *H02P 7/18* | (2006.01) |
| *G05F 1/00* | (2006.01) |

(52) U.S. Cl.
CPC ............... *H02P 3/22* (2013.01); *H02M 7/5388* (2013.01); *H02P 6/085* (2013.01)

(58) Field of Classification Search
USPC ............... 318/599, 811, 400.26–400.29, 293, 318/294, 560, 561; 360/69, 75
See application file for complete search history.

(56) References Cited

U.S. PATENT DOCUMENTS

| | | | |
|---|---|---|---|
| 4,804,892 | A | 2/1989 | Müller |
| 5,091,680 | A | 2/1992 | Palm |
| RE34,609 | E | 5/1994 | Müeller |
| 5,504,402 | A | 4/1996 | Menegoli |
| 5,508,874 | A | 4/1996 | Williams et al. |
| 5,828,245 | A | 10/1998 | Brambilla et al. |
| 6,020,695 | A | 2/2000 | Kelly et al. |
| 6,023,143 | A * | 2/2000 | Salina et al. .................. 318/599 |
| 6,137,253 | A | 10/2000 | Galbiati et al. |
| 6,140,784 | A | 10/2000 | Mazda |

(Continued)

OTHER PUBLICATIONS

Intersil Corporation Data Sheet FN9098.5 (May 12, 2005) which is entitled "Multi-Phase PWM Controller with Precision Rds (On) or DCR Differential Current Sensing for VR 10.X Application."*

(Continued)

*Primary Examiner* — Paul Ip
*Assistant Examiner* — Said Bouziane
(74) *Attorney, Agent, or Firm* — Seed IP Law Group PLLC

(57) ABSTRACT

A drive circuit having asymmetrical drivers. In an embodiment, a brushless DC motor may be driven by a drive circuit having three high-side MOSFETs and three low-side MOSFETs. A driver controller turns the MOSFETs on and off according to a drive algorithm such that phase currents are injected into motor coils to be driven. The high-side MOSFETs may be sized differently than the low-side MOSFETs. As such, when a MacDonald waveform (or similar drive algorithm) is used to drive the phases of the motor, less power may be required during disk spin-up because the MOSFETs that are on more (e.g., the low-side MOSFETs with a MacDonald waveform) may be sized larger than the MOSFETs that are on less (e.g., the high-side MOSFETs). In this manner, less power is dissipated in the larger size MOSFETs that are on more than the others.

9 Claims, 4 Drawing Sheets

(56) References Cited

U.S. PATENT DOCUMENTS

| | | | |
|---|---|---|---|
| RE37,589 E | 3/2002 | Müeller | |
| 6,515,443 B2 | 2/2003 | Kelly et al. | |
| 6,566,832 B2 | 5/2003 | Ataee | |
| 6,741,066 B1 | 5/2004 | Densham et al. | |
| 6,768,623 B1 | 7/2004 | Shen | |
| 6,970,319 B1 | 11/2005 | Bennett et al. | |
| 6,972,918 B2* | 12/2005 | Kokami | G11B 5/54 360/69 |
| 6,977,482 B2 | 12/2005 | Popescu-Stanesti et al. | |
| 6,995,537 B1 | 2/2006 | Plutowski et al. | |
| 7,005,817 B2 | 2/2006 | Thiesfeld et al. | |
| 7,054,089 B2 | 5/2006 | Kokami | |
| 7,068,455 B2 | 6/2006 | Tanner | |
| 7,068,460 B2 | 6/2006 | Brenden et al. | |
| 7,092,197 B2 | 8/2006 | El-Sherif et al. | |
| 7,116,512 B1 | 10/2006 | Rana et al. | |
| 7,256,554 B2 | 8/2007 | Lys | |
| 7,274,529 B2 | 9/2007 | Ho et al. | |
| 7,348,760 B2 | 3/2008 | Bucur et al. | |
| 7,358,706 B2 | 4/2008 | Lys | |
| 7,385,364 B1 | 6/2008 | Rana et al. | |
| 7,420,348 B2 | 9/2008 | Fukamizu et al. | |
| 7,548,392 B1 | 6/2009 | Desai et al. | |
| 7,564,220 B2 | 7/2009 | Niculae et al. | |
| 7,612,521 B2 | 11/2009 | Miyajima | |
| 7,649,330 B2 | 1/2010 | Yamashita et al. | |
| 7,652,459 B2 | 1/2010 | Abu Qahouq et al. | |
| 7,659,673 B2 | 2/2010 | Lys | |
| 7,692,394 B2 | 4/2010 | Hill et al. | |
| 7,773,351 B2 | 8/2010 | Kanai | |
| 7,848,045 B1* | 12/2010 | Li et al. | 360/75 |
| 7,863,841 B2* | 1/2011 | Menegoli et al. | 318/400.29 |
| 7,902,778 B2 | 3/2011 | Yamashita et al. | |
| 8,026,706 B2 | 9/2011 | Abu Qahouq et al. | |
| 8,030,861 B2 | 10/2011 | Hoogzaad | |
| 8,125,207 B2* | 2/2012 | Houston | H02M 3/1584 323/212 |
| 8,144,420 B1* | 3/2012 | Li et al. | 360/75 |
| 2001/0030880 A1 | 10/2001 | Miyazaki et al. | |
| 2002/0006007 A1 | 1/2002 | Ataee | |
| 2002/0017887 A1 | 2/2002 | Gotou et al. | |
| 2002/0053890 A1 | 5/2002 | Gotou et al. | |
| 2002/0060544 A1 | 5/2002 | Teutsch et al. | |
| 2002/0079856 A1 | 6/2002 | Hill et al. | |
| 2003/0117918 A1 | 6/2003 | Thiesfeld et al. | |
| 2004/0100722 A1 | 5/2004 | Kokami | |
| 2004/0189221 A1* | 9/2004 | Kurosawa et al. | 318/254 |
| 2005/0018339 A1 | 1/2005 | Tanner | |
| 2005/0018340 A1 | 1/2005 | Tanner | |
| 2005/0067986 A1* | 3/2005 | Kurosawa et al. | 318/254 |
| 2005/0213352 A1 | 9/2005 | Lys | |
| 2005/0213353 A1 | 9/2005 | Lys | |
| 2005/0218853 A1 | 10/2005 | Kokami | |
| 2005/0218870 A1 | 10/2005 | Lys | |
| 2005/0219872 A1 | 10/2005 | Lys | |
| 2005/0248308 A1 | 11/2005 | Reed et al. | |
| 2005/0264921 A1 | 12/2005 | El-Sherif et al. | |
| 2006/0007581 A1 | 1/2006 | Brenden et al. | |
| 2006/0072237 A1 | 4/2006 | Kokami | |
| 2006/0103363 A1* | 5/2006 | Miftakhutdinov | 323/282 |
| 2006/0158142 A1* | 7/2006 | Kurosawa et al. | 318/254 |
| 2006/0208680 A1 | 9/2006 | Fukamizu et al. | |
| 2006/0232244 A1* | 10/2006 | Vieira Formenti | H02J 7/027 320/128 |
| 2006/0238160 A1 | 10/2006 | Fukamizu et al. | |
| 2007/0046228 A1 | 3/2007 | Ogino et al. | |
| 2007/0046229 A1 | 3/2007 | Ogino et al. | |
| 2007/0078568 A1 | 4/2007 | Donaldson et al. | |
| 2007/0090766 A1 | 4/2007 | LaGrave et al. | |
| 2007/0188906 A1 | 8/2007 | Ho et al. | |
| 2007/0195451 A1 | 8/2007 | Kokami | |
| 2007/0285827 A1 | 12/2007 | Yamashita et al. | |
| 2007/0285828 A1 | 12/2007 | Yamashita et al. | |
| 2008/0007236 A1* | 1/2008 | Elbanhawy | H02M 3/157 323/283 |
| 2008/0116861 A1* | 5/2008 | Kernahan | H03H 11/265 323/267 |
| 2008/0203992 A1* | 8/2008 | Qahouq | H02M 3/157 323/299 |
| 2008/0284500 A1 | 11/2008 | Chigira | |
| 2008/0291588 A1 | 11/2008 | Kanai | |
| 2008/0310046 A1* | 12/2008 | Menegoli et al. | 360/75 |
| 2009/0033293 A1* | 2/2009 | Xing et al. | 320/164 |
| 2009/0045762 A1 | 2/2009 | Hayashi et al. | |
| 2009/0080115 A1* | 3/2009 | Kokami et al. | 360/266.4 |
| 2009/0243706 A1* | 10/2009 | Hsueh | H02M 3/07 327/536 |
| 2009/0284193 A1 | 11/2009 | Hoogzaad | |
| 2009/0315490 A1* | 12/2009 | Hoogzaad | H02P 23/0063 318/376 |
| 2010/0002331 A1 | 1/2010 | Tan | |
| 2010/0117616 A1 | 5/2010 | Qahouq et al. | |
| 2010/0141191 A1* | 6/2010 | Chen | H02P 6/18 318/400.33 |
| 2011/0074374 A1* | 3/2011 | Galbiati | 323/282 |
| 2013/0176015 A1* | 7/2013 | Sato et al. | 323/317 |

OTHER PUBLICATIONS

U.S. Appl. No. 12/505,822, filed Jul. 20, 2009.

* cited by examiner

ASYMMETRICAL DRIVER

PRIORITY CLAIM TO PROVISIONAL PATENT APPLICATION

This patent application claims priority to U.S. Provisional Patent Application No. 61/115,870 entitled 'ASYMMETRICAL DRIVER,' and which was filed on Nov. 18, 2008 and is hereby incorporated by reference.

BACKGROUND

Hard disk drives (HDD) are becoming smaller while at the same time providing greater storage capacity. One reason for these advances is the more prevalent use of brushless direct current motors (BLDC motor) to rotate the HDD. Further yet, a BLDC motor may be a three-phase motor and be driven by pulse-width modulation (PWM). For example, U.S. Pat. No. 6,137,253, which is incorporated by reference, discloses driving each of three BLDC motor coils with a respective PWM signal that causes a sinusoidal (or approximately sinusoidal) current to flow through each of the coils. By causing phase shifted (by approximately 120°) sinusoidal currents to flow through the coils, the BLDC motor is driven with a constant or approximately constant torque. This may be desirable in an application, such as disk drive applications, where it may be desirable to reduce or eliminate torque ripple in the rotation of the motor and that which the motor is rotating (e.g., a disk).

In one application, BLDC motor coils are driven with what is called a MacDonald voltage wave form, which is a PWM waveform that is described in U.S. Pat. No. 6,137,253. The MacDonald voltage wave form, when used to drive the motor coils, causes sinusoidal currents to flow through the coils. This may be accomplished by using a drive circuit having two drivers that comprise a high-side driver and a low-side driver. Thus, the Macdonald waveform may be conditioned to hold, for each 120° portion of the electrical period, one of the high-side or low-side drivers (MOSFET transistors in one example) for one of the coils in an ON state. Holding the high-side or low-side driver in an ON state may significantly reduce the switching losses in each drive transistor, and thus may significantly reduce the power dissipated by the chip.

While it may be desired that the spindle differential phase-to-phase current waveform be as symmetrical as possible (sinusoid) in order to have a constant spindle torque, there is no requirement that the absolute spindle phase voltage be held to a specific voltage to achieve this. Therefore, driver designers use this freedom to improve the driver operation through various drive algorithms that drive each phase pair or drivers, which may lead to reducing the switching losses, for example.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
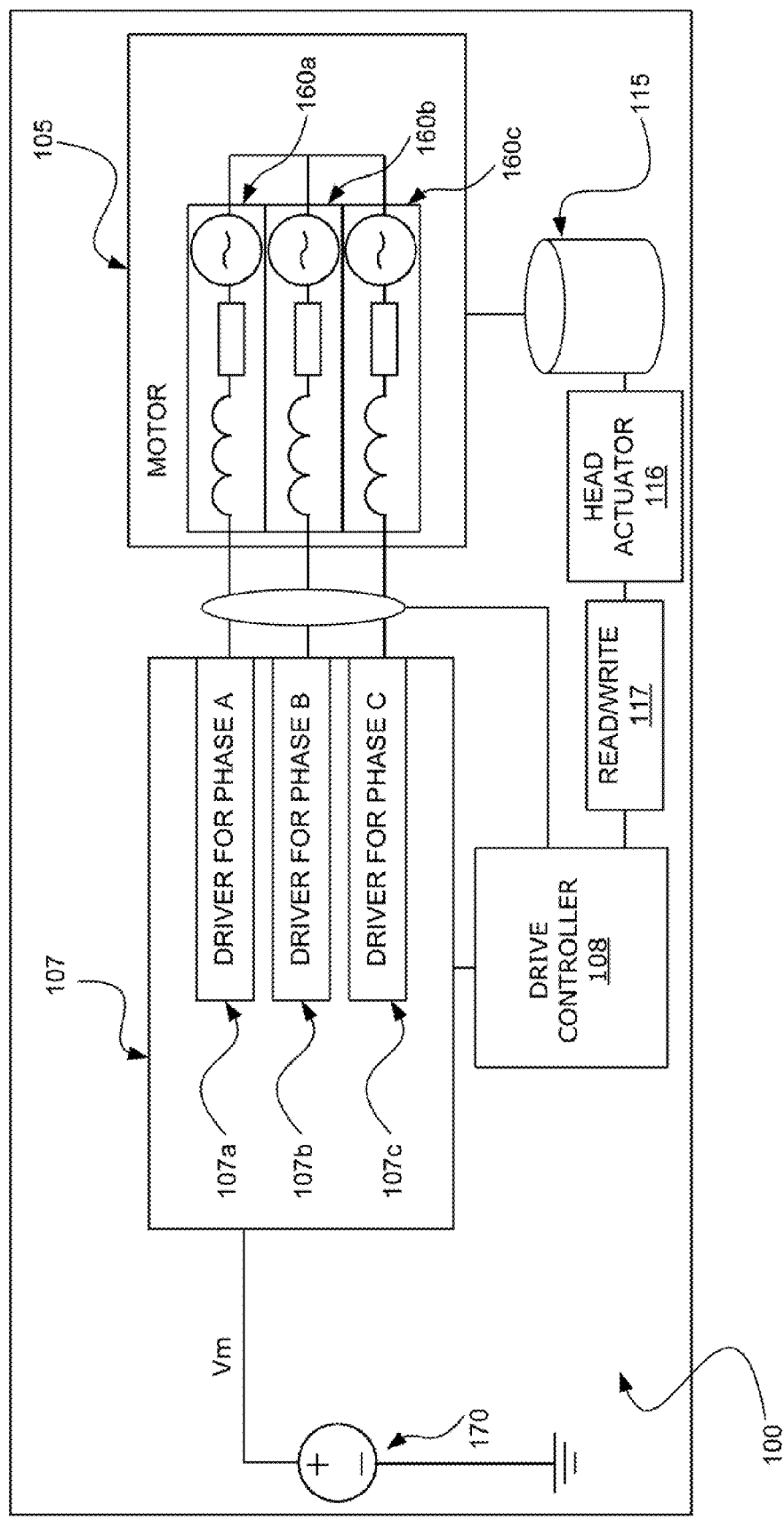
FIG. 1 is a block diagram of an embodiment of a HDD having a motor for driving a disk with an asymmetrical driver circuit.

FIG. 1 is a block diagram of an embodiment of a HDD having a motor for rotating a disk with an asymmetrical driver circuit. The spindle motor 105 may be a three-phase brushless direct-current motor (BLDC motor) that may be driven synchronously by a controller 108, which may control a power chipset 107. Thus, instead of a mechanical commutation system based on brushes typically found in a brushed DC motor, the brushless DC motor 105 is commutated using electronic circuitry. Such circuitry may include driver circuits 107a-107c for each phase of the BLDC motor 105, (e.g., MOSFET transistors as described further below with respect to FIG. 2), which are part of the power chipset 107. Further, the power chip set 107 may be an integrated circuit disposed on a single die, or may be multiple integrated circuits and/or non-integrated circuit components disposed on separate dies or otherwise separately from each other. Other variations of one or more integrated circuit dies are possible as well. For example, the drive controller 108, the power chip set 107, the read/write channel 117 and other components may all be disposed on the same integrated circuit die, each component separately disposed on separate integrated circuit dies, or any combination thereof.

The speed of the BLDC motor 105 depends on the voltages applied at its phases. By varying the average voltage across the phases, the revolutions per minute (RPM) of the BLDC motor 105 may be altered. This is achieved by altering the duty cycle of each phase's driver circuit 107a-107c. Thus, each phase 160a-c may receive coordinated pulse-width modulated (PWM) signals having a duty cycle at the drive nodes of the respective driver circuits 107a-107c (i.e., gates of their respective MOSFETs as shown below in FIG. 2) that are suited to produce a specific motor speed. Typically, the higher the duty cycle, the higher the speed. Thus, the driver circuits 107a-107c may be switched on and off at a specific rate to produce a desired duty cycle, which, in turn, drives the BLDC motor 105 at a desired speed.

In operation, a power supply 170 provides a voltage to a voltage bus Vm. This voltage may be, for example, 12V for HDD systems in desktop computers and may be 5V is HDD systems in laptop computers. This voltage not only provides power to drive the BLDC motor 105, but also provides power to the other portions of the HDD 100. Other portions of the HDD 100 may include read/write channel circuitry 117, read/write head actuation devices 116, the hard disk(s) 115 and the like.

Although described as a HDD system 100 herein, the methods and applications discussed herein may be applicable to any device having a motor for rotating a disk or other device. For example, a DVD drive, a CD drive, and other similar devices may also employ the methods and techniques discussed herein. As illustrated below, power savings may be realized by tailoring the specific sizes of the respective components of each driver circuit 107a-107c.

Figure 2:
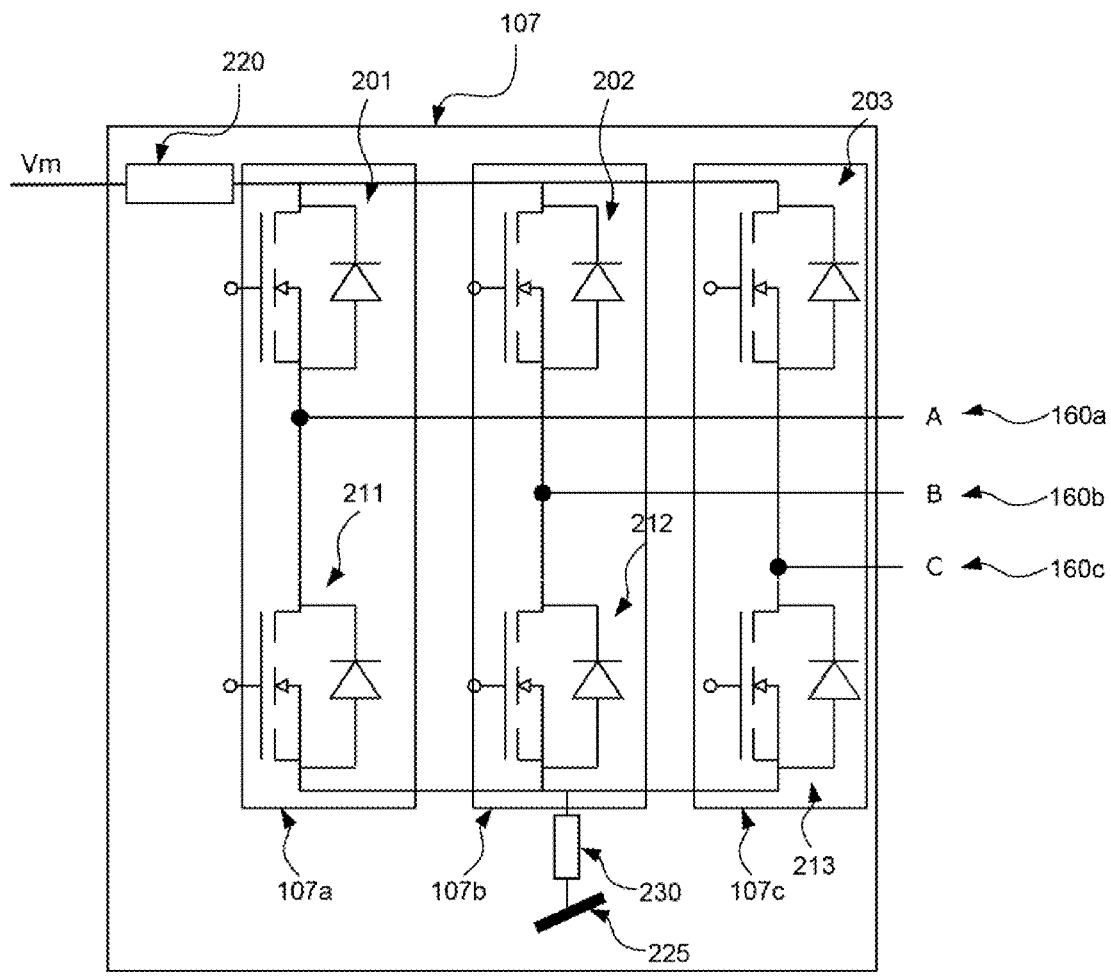
FIG. 2 is a schematic diagram of an embodiment of a drive circuit of FIG. 1 having asymmetrical drivers.

FIG. 2 is a schematic diagram of an embodiment of a drive circuit of FIG. 1 having asymmetrical drivers. The drive circuit 107 of FIG. 1 is shown in greater detail wherein each phase's driver circuit 107a-107c includes a respective high-side driver 201, 202, and 203 and a respective low-side driver 211, 212, and 213. Thus, for phase A, the driver circuit 107a includes a high-side MOSFET transistor 201 and a low-side MOSFET transistor 211. Similarly, a phase B driver circuit 107b includes a high-side MOSFET transistor 202 and a low-side MOSFET transistor 212. Finally, a phase C driver circuit 107c includes a high-side MOSFET transistor 203 and a low-side MOSFET transistor 213. The gates of each of these transistors may be coupled to a drive controller (108 of FIG. 1) such that each transistor may be turned ON or OFF according to a particular drive waveform (e.g., a MacDonald waveform).

These MOSFET transistors compose three sets of bi-directional drivers 201/211, 202/212 and 203/213 (these MOSFET transistor pairs may also be called half bridges) that drive the phases 160a-c of the BLDC motor 105. The drive controller 108 may implement control of the MOSFET transistors by monitoring a current through sense resistor 230 or a sense transistor in parallel with an isolation transistor 220 (discussed below), and/or monitoring the supply voltage Vm, and monitoring the BLDC motor 105 position using conventional sensorless techniques to produce desired phase voltages, and, therefore, a corresponding motor speed. More advanced controllers 108 may employ a microprocessor to manage the disk's acceleration/deceleration, control the disk's speed, and fine-tune efficiency of delivery of power to actuating the disk.

In many applications, the PWM pulses that represent the MacDonald wave form are asymmetrical (from an absolute reference). That is, the pulses that compose the MacDonald voltage may activate one of the high-side and low-side drive transistors of a phase for less than half of the time, and activate the other of the high-side and low-side drive transistors for more than half of the time. The time during which the one drive transistor is ON verse the time that the other drive transistor is ON depends, e.g., on the supply voltage Vm that is being switched to the coil, the rotational speed of the BLDC motor, and the coil current needed to maintain that rotational speed.

Thus, in one example embodiment, if the supply voltage Vm is relatively high, then, for each phase, the high-side drive transistor is ON for a shorter duration of time as compared to the amount of time that the low-side transistor is ON. But for the same disk rotational speed, as the supply voltage Vm decreases, then the high-side drive transistor may be ON for a longer duration of time than it is with a higher Vm. For example, the high-side transistor may be ON for approximately 48% or less of the drive-transistor ON time during the phase drive cycle, and the low-side transistor may be ON for approximately 52% or more of the drive-transistor ON time during the phase drive cycle.

The drive circuit 107 may further include an isolator 220, sometimes called an isolation transistor or isolation field-effect transistor (isofet), that is disposed between the Vm supply-voltage node and the high-side driver transistors 201, 202, and 203. The isofet 220 allows the drive controller 108 (FIG. 1) to isolate the supply voltage Vm from the high-side transistors 201, 202, and 203 by turning the isofet 220 OFF, for example, in case of a short circuit.

Disk-drive manufacturers may specify a value of diagonal RDSon for the drive circuit 107, where diagonal RDSon is the maximum sum, or a maximum weighted sum of the ON resistances of the isofet 220, a high-side transistor, a low-side transistor. In a bridge configuration where two coils are being driven in series, a current flows from the supply voltage node Vm, through the isofet 220, through a high-side transistor, through the coils of a first respective phase and subsequent second respective phase, and through a low-side transistor of another H-bridge, to the low-power rail 225. Thus, diagonal RDSon is the maximum combined series ON resistance of these two driving transistors and the isofet 220. For example, a specification of 0.3 ohms for the diagonal RDSon indicates that when the isofet 220, a first high-side transistor of one H-bridge (MOSFET 201 for example), and then one diagonally opposite low-side transistor of another different H-bridge (MOSFET 213, for example, to cause a current to flow through coils A and C) are all ON, the total path resistance due to these three transistors can be no greater than 0.3 ohms.

However, there may be no requirement or reason that these transistors need to have equivalent RDSon values. That is, with the specification of a diagonal RDSon of 0.3 ohms, one need not size each transistor (isofet 220, high-side MOSFET and low-side MOSFET) to have an RDSon of 0.1 ohms. As such, these transistors may be sized differently. Furthermore, when a motor-controller manufacture specifies a diagonal RDSon for the driver circuit 107, it typically calculates the diagonal RDSon by adding together the RDSon of the isofet, and the duty-cycle weighted RDSons of any one of the high-side and any one of the low-side transistors for a specified load current range, because all of the high-side transistors may have substantially the same weighted RDSon, as may all of the low-side transistors. But by sizing the high-side MOSFETs and low-side MOSFETs with a specific asymmetric ratio, a power savings may be realized because of the asymmetry of the drive algorithm. The specific ratio chosen may yield different power savings as shown below in FIG. 3.

Figure 3:
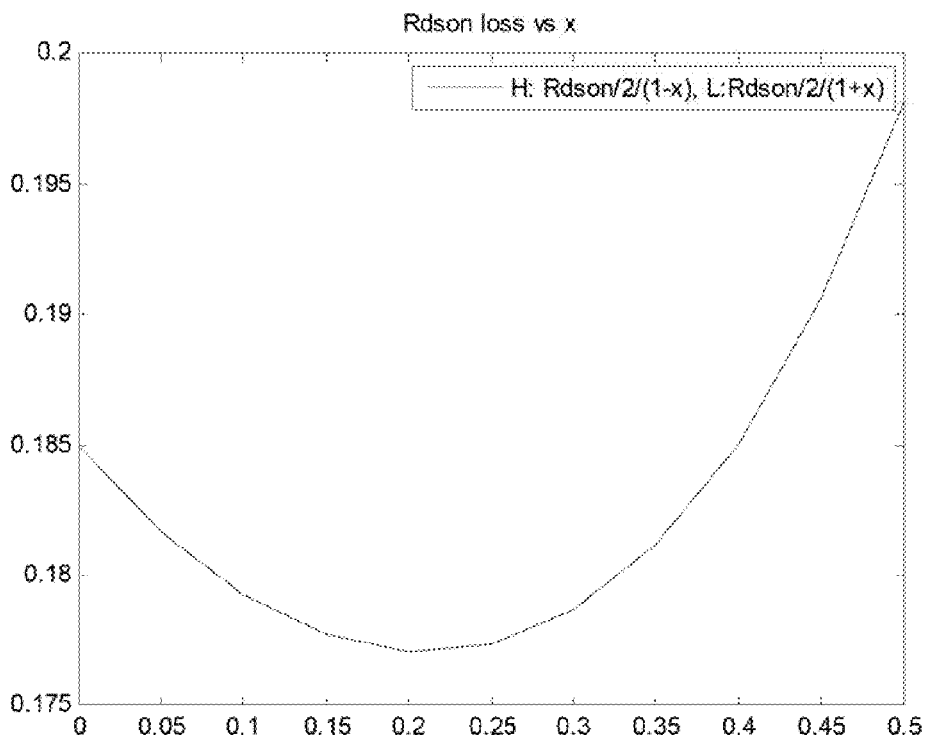
FIG. 3 is a plot of the ratio of asymmetry in the drive transistors of FIG. 2 against spin-up losses in a hard drive system illustrating an embodiment of a driving method wherein the drive circuit is asymmetrical.

FIG. 3 is a plot of the ratio of asymmetry in the drive transistors of FIG. 2 against the average spin-up losses in an embodiment of an HDD system where the drive transistors are pulse-width modulated ON and OFF in an asymmetric fashion according to a McDonald waveform, which causes, on average, the low-side transistors to be on longer than the high-side transistors. In this plot, the y-axis represents the power loss during the start-up, or spin-up period of the disk being rotated by the motor, and the x-axis represents the factor x of asymmetry between the two high- and low-side MOSFETs that, together with the isofet 220, compose the diagonal RDSon as discussed above.

In this embodiment, the low-side transistor has a larger size (e.g., width), and thus a smaller RDSon, than the high-side transistor, because as stated above, the McDonald waveform may dictate that the low-side transistor is ON for a longer portion of a phase cycle than the high-side transistor. For example, the relative size of the high-side transistor is given by 1−x, and the relative size of the low-side transistor is given by 1+x. So, where x=0.2, then the relative size of the high-side transistor is 1−0.2=0.8, the relative size of the low-side transistor is 1+0.2=1.2, such that the low-side transistor is 50% larger than the high-side transistor. It follows, therefore, that the RDSon of the high-side transistor is increased to 1.25 times its value for x=0, and that the RDSon of the low-side transistor is decreased to 0.83 times its value for x=0, such that the RDSon of the high-side transistor is approximately 50% larger than the RDSon of the low-side transistor. In an embodiment, the range of x in FIG. 3 is from x=0, meaning that both transistors are sized the same, to x=0.5. As stated above, the y-axis represents the total power loss during disk spin-up. Further, one may assume that each transistor's RDSon value is inversely proportional to its channel width, and proportional to its channel length. In an embodiment where only the width is varied, one may use "width" and "size" interchangeably.

Thus, in the embodiment represented by the plot in FIG. 3, one may see that that the value of x that yields the lowest average power loss over the entire spin-up period is approximately x=0.2. Therefore, with reference back to FIGS. 2-3, in an embodiment, one may realize the smallest losses over the duration of disk spin-up (and over the duration of steady-state disk operation under a similar theory as discussed below) by sizing one or more of the H-bridge transistors (the low-side MOSFETs, for example) to have a smaller RDSon than one or more opposite H-bridge transistor (the high-side MOSFETs, for example).

During steady-state operation where the motor is operating at a steady-state speed, one may take into account the duty cycle when calculating the diagonal RDSon.

As a first example, both high and low H-bridge transistors may have the same RDSon values, e.g., RDSon=0.1 ohms for both the high-side 201 and low-side 212 transistors. This may be because each transistor is sized the same, i.e., x=0. Then, for any duty cycle D, the effective diagonal RDSon of the bridge (excluding the isofet for purposes of example because the isofet experiences a 100% duty cycle) is going to be 0.1 ohms because the high-side 201 and low-side 212 transistors are generally not ON or OFF at the same time (except perhaps during negligible times during zero-crossings of the driving waveform to sense the motor position). For example, where D=40%, meaning that the high-side transistor is ON for approximately D=40% of the cycle and the low-side transistor is ON for approximately 100%–D=60% of the cycle, the effective diagonal RDSon=0.4×0.1 (the effective RDSon of the high-side transistor)+0.6×0.1 (the effective RDSon of the low-side transistor)=0.1 ohms. Therefore, the power-loss through such a drive circuit is substantially independent on duty cycle.

But where the high- and low-side transistors are asymmetrically sized, a duty-cycle-dependent power savings may be realized. Thus, if the high-side 201 and low-side 212 transistors are driven with equal duty cycles, then the effective diagonal RDSon of the bridge is going to be the sum of the effective RDSons of the high-side and low-side transistors divided by two. However, if the duty cycle is shifted to favor one side over the other, the effective RDSon may yield a relative power savings as discussed below.

To illustrate this further, assume a low-side transistor 212 has an RDSon of 0.1 ohms and a high-side transistor 201 has an RDSon of 0.2 ohms. At a 50% duty cycle, the effective diagonal RDSon of these two transistors is 0.15 ohms per above. But now assume a 40% duty cycle, wherein the low-side transistor 212 is ON approximately 60% of the cycle time and the high-side transistor 201 is ON approximately 40% of the cycle time. This results in an effective diagonal RDSon of 0.6×0.1 (the effective RDSon of the low-side transistor 212)+ 0.4×0.2 (the effective RDSon of the high-side transistor 201)=0.14 ohms, which is smaller than the 0.15 ohms calculated above for the 50% duty cycle. Because power dissipation is proportional to the effective diagonal RDSon, asymmetrical low-side and high-side transistors may reduce power losses. For example, one can see that in at least the above example, the equivalent diagonal RDSon goes down if the duty cycle increases in favor of the transistor with the lower RDSon, in this example, the low-side transistor 212. And this may translate into a power savings as illustrated in FIGS. 4 and 5.

Figure 4:
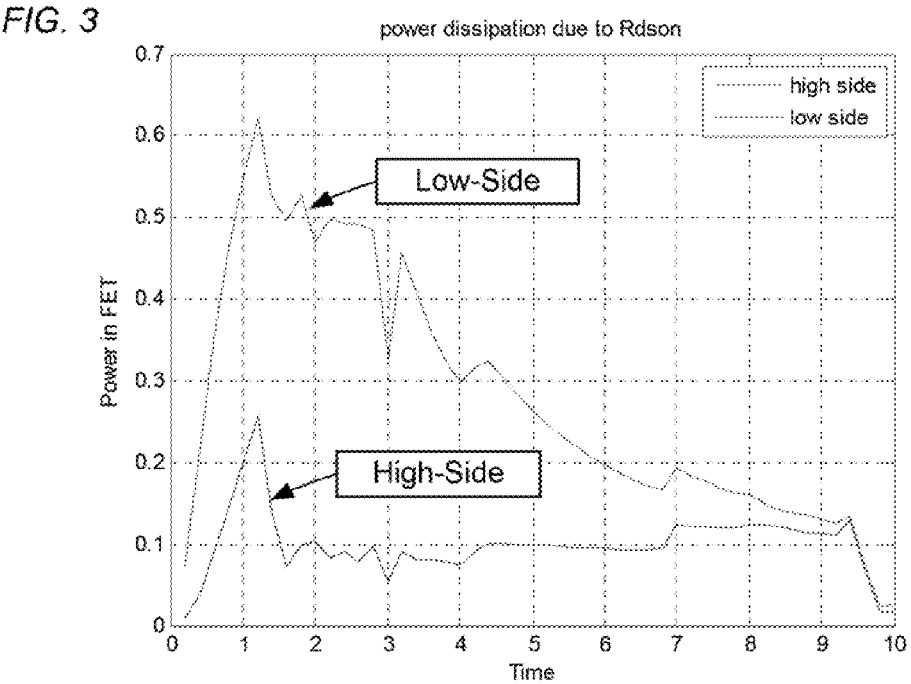
FIG. 4 is a plot of power dissipated in drive transistors of FIG. 2 illustrating an embodiment of a driving method wherein the drive circuit is symmetrical.

FIG. 4 is a plot of power dissipated in drive transistors of FIG. 2 illustrating an embodiment of a driving method wherein the drive circuit is approximately symmetrical (all the drive MOSFETs (both high-side and low-side) are sized approximately the same). This plot assumes a driving algorithm that uses a MacDonald waveform over the course of time when a disk is spinning up. Thus, one can see that the low-side MOSFET consumes more power than the high-side MOSFET because of the nature of the MacDonald waveform (average duty cycle of less than 50%) and due to the fact in this embodiment, the system has a current limiter (not shown) which, to maintain the peak current below a threshold, limits the duty cycle (time when a high-side transistor is ON) to lower number (e.g., ~20%). That is, the current limiter in this embodiment increases the asymmetry of the PWM ratio. The total power dissipated in the high-side and low-side transistors as a function of time is approximately equal to a sum of the two plots in FIG. 4.

Figure 5:
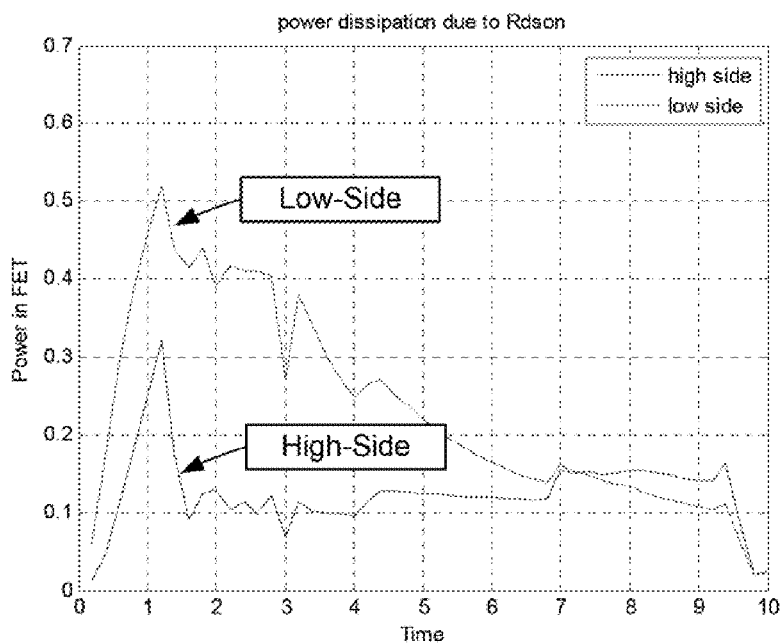
FIG. 5 is a plot of power dissipated in drive transistors of FIG. 2 illustrating an embodiment of a driving method wherein the drive circuit is asymmetrical.

FIG. 5 is a plot of power dissipated in the high- and low-side drive transistors of FIG. 2 in an embodiment the drive circuit is asymmetrical in size. This plot also assumes that the transistors are driven with a PWM version of the MacDonald waveform over the course of time when a disk is spinning up. However, the low-side MOSFETs are sized approximately 50% larger than the high-side MOSFETs. Thus, one can see that the low-side MOSFETs still consume more power than the high-side MOSFETs but less than if they are sized the same as the high-side MOSFETs per FIG. 4. The power consumed by the high-side MOSFETs increases in this example, but not enough to overcome the power savings from the reduced power consumption of the low-side MOSFETs. Thus, in this embodiment, the transistor having the smaller RDSon value is the transistor that will be ON more of the time than the other transistor. In this embodiment, this decreases the total power dissipation of the drive circuit 107, and the total power dissipation of the HDD. The estimated decrease in power dissipation during the spin up is about 3.9% and during the steady state is about 4.7%. The results may be different if the motor is driven using a waveform other than the MacDonald waveform.

In summary, one may decrease the RDSon and effective RDSon value of a transistor by increasing its width-to-length ratio. That is, by increasing the actual size of the transistor, the RDSon value will decrease. If die space is not a concern, then one may simply optimize the power savings of the drive circuit 107 by increasing the size of the MOSFETs that see the longer average ON times. Similarly, one may also decrease the sizes of the opposite MOSFETs so long as other drive parameters are still met, e.g., driving current to a respective phase.

In yet another embodiment, one may keep the die size the same by decreasing the size of the transistors with the higher RDSon value by as much as the size increase in the transistors with the lower RDSon values. Therefore, one may keep the die size the same yet still realize reduced power consumption. For example, if a symmetrical driver has an equal number of high-side and low-side transistors with normalized widths of 1, then the total width of all the transistors is N, where N is the number of drive transistors. But, an asymmetrical drive circuit having N/2 transistors of width 1.2 and N/2 transistors of 0.8 also has a total width of all the transistors equal to N.

Using this technique, one may realize more of a power or die size savings the bigger the disk drive, and thus the higher currents and voltages that are used to drive the motor. That is, one may be more likely to see a measurable advantage in big server disk drives, and even desktop computer disk drives, than in smaller disk drives like the disk drives that go in cameras or other portable devices.

One may also use this technique to reduce transistor size, and thus die size, without increasing power dissipation. Furthermore, increasing the size, and thus decreasing the RDSon, of the drive transistors that conduct most of the load current may increase the yield and reliability of the motor controller (or other circuitry that includes the drive transistors) because at least some failure analysis studies have shown that the drive transistors conducting most of the load current fail at a higher rate than the drive transistors conducting less of the load current.

Another feature of HDD systems is using the disk momentum to generate power (by using the motor as a generator) to park the head and perform other shut down tasks in an emergency or other sudden power-down situation. Such a technique is described in related U.S. patent application Ser. No. 12/505,822 entitled "MANAGEMENT OF DISK DRIVE DURING POWER LOSS" and which is incorporated herein by reference.

In this method, a drive controller 108 (FIG. 1) may turn the high-side and low-side MOSFETs on and off in a drive algorithm suited to prolong power generated by the spinning disk when primary power is lost. As such, power savings may also be realized in the application of this driving algorithm by sizing the particular transistors that are on more to have a smaller RDSon value. Therefore, during the disk braking, a relatively large current may flow through the high-side or low-side drive transistors. Reducing RDSon in the ones of these transistors carrying the braking current may then reduce power and heat dissipated in these transistors.

In one embodiment, there is a decrease in total power dissipation in the drive transistors, and in the motor controller circuit as a whole, during braking of approximately 16.7%. This allows the circuit to run cooler during braking. Such power savings during braking may provide only a small advantage to a disk drive during normal operation within a device (e.g., computer) in which the disk drive is installed, because emergency and other sudden shut downs occur relatively infrequently, and because the energy stored in the disk momentum will be dissipated anyway, whether by the braking or by dissipation in the transistors. But such lower power dissipation during braking may provide a larger advantage during the manufactures' testing of the disk drives, and particularly of the disk drive heads.

A manufacturer may test the robustness of a read write head during a braking procedure to determine how resilient the head is to bumping into the rough surface of the disk during the parking procedure. A manufacturer may do this by cycling the head through a number, e.g., 10,000, emergency/sudden braking cycles. But because the disk drive controller (or other circuit used to test the head) has a maximum temperature rating, the rate at which the head is cycled is slow enough to prevent the controller temperature from exceeding this maximum rating. Therefore, by reducing the power dissipation through the drive transistors as discussed above, the manufacturer may increase the cycle rate without exceeding the controller temperature rating, and thus may decrease the total test time.

Figure 6:
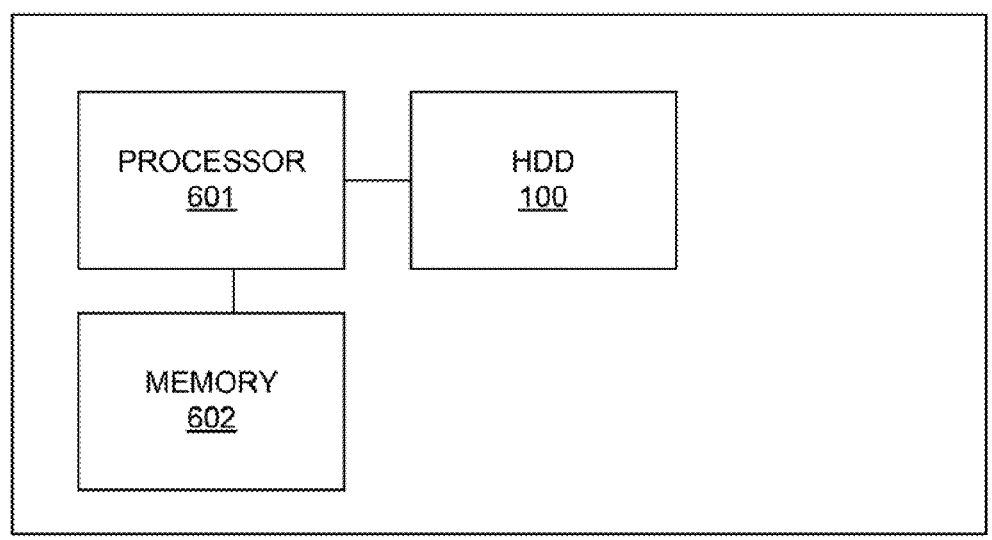
FIG. 6 is a block diagram of an embodiment of computer system having the HDD system of FIG. 1.

FIG. 6 is a block diagram of an embodiment of computer system having the HDD system of FIG. 1. In this embodiment, the HDD system 100 as described above may be part of a computer system 600 having a processor 601 coupled to a system memory 602. Such a computer system 600 may be a personal computer system, server computer system, portable computing device, mobile phone, personal data assistant, and the like.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A controller, comprising:
   a disk-drive controller operable to control operation of a disk drive; and
   a drive circuit coupled to the disk-drive controller and operable under control of the disk-drive controller to control operation of a motor in the disk drive, the drive circuit comprising a first drive component having a first value of a drive characteristic and a second drive component having a second value of the drive characteristic, the second value being different than the first value, and the first drive component comprising a first transistor and the second drive component comprising a second transistor and the first and second drive characteristics corresponding to respective RDSon values for the first and second transistors; and
   wherein the disk-drive controller is operable to asymmetrically activate the first and second drive components and the first and second values of the first and second drive characteristics have values that are a function of characteristics of the asymmetrical activation to thereby reduce a power loss in the first and second drive components relative to a power loss in the first and second drive components when the first and second drive characteristics have the same value, the disk-drive controller operable to pulse width modulate the first and second transistors in an asymmetric manner to thereby activate the one the first and second transistors having the lower RDSon value for a longer duration than the other one of the first and second transistors during a cycle of the pulse width modulation.

2. The controller of claim 1 wherein:
   the first transistor of the first drive component comprises one of a high side and a low side driver; and
   the second transistor of the second drive component comprises the other of the high side and low side driver.

3. The controller of claim 1, further comprising a first integrated circuit die comprising the disk-drive controller coupled to a second integrated circuit die comprising the drive circuit.

4. The controller of claim 1, further comprising a single integrated circuit die.

5. The controller of claim 2, wherein the first and second transistors comprise MOSFET transistors and width-to-length ratios of these MOSFET transistors is such that the first MOSFET transistor comprises a size that is 50% larger than the second MOSFET transistor.

6. A disk drive system, comprising:
   a motor;
   a disk coupled to the motor and operable to be rotated by the motor; and
   a motor controller having a drive circuit operable to drive the motor, the drive circuit including:
      a first drive circuit including a first transistor and having a first value of a drive characteristic corresponding to the RDSon of the first transistor;

a second drive circuit including a second transistor and having a second value of the drive characteristic corresponding to the RDSon of the second transistor, the second value being different than the first value; wherein the motor controller is operable to turn on the first drive circuit for a first portion of a drive period and to turn on the second drive circuit for a second portion of the drive period that is greater than the first portion, the motor controller turning on the one of the first and second transistors having the lower RDSon value for the second portion and the other one of the first and second transistors for the first portion.

7. The disk drive system of claim 6 wherein the motor comprises a three-phase, brushless direct-current motor.

8. The disk drive system of claim 6, further comprising:
    a memory coupled to the drive circuit and operable to store a drive algorithm; and
    a driver controller coupled to the memory and operable to control the drive circuit according to the stored drive algorithm.

9. The disk drive system of claim 6 wherein the first and second drive circuits comprise MOSFET transistors and width-to-length ratios of these MOSFET transistors is such that the first MOSFET transistor comprises a size that is 50% larger than the second MOSFET transistor.

* * * * *